Patented Oct. 2, 1934

1,975,246

UNITED STATES PATENT OFFICE 1,975,246

ALKYD RESIN

Frithjof Zwilgmeyer, Hamburg, N. Y., assignor to National Aniline and Chemical Company, Inc., New York, N. Y., a corporation of New York No Drawing. Application April 19, 1930, Serial No. 445,841

12 Claims. (Cl. 260—8)

This invention relates to compositions of the class of resinous condensation products derived from an organic polycarboxylic acid and a polyhydric alcohol, which products have come to be known as "alkyd" resins or resins of the "Glyptal" type.

Resinous materials have heretofore been made by the partial esterification of a polyhydric alcohol with an organic polycarboxylic acid to form an intermediate product containing unesterified hydroxyl groups followed by further condensation of the intermediate product with an aliphatic unsaturated mono-carboxylic acid of high molecular weight. (Cf. U. S. P. 1,098,777.)

An object of the present invention is the preparation of new resinous condensation products.

Another object of the present invention is the preparation of resinous condensation products derived from a polyhydric alcohol, an organic polycarboxylic acid, and a straight-chain aliphatic unsaturated mono-carboxylic acid of low molecular weight.

A further object of the present invention is the preparation of resinous condensation products derived from a polyhydric alcohol, an organic polycarboxylic acid, and acrylic acid.

Other objects of the invention will in part be obvious and will in part appear hereinafter.

The invention accordingly comprises the new products as well as the several steps and the relation of one or more of such steps with respect to each of the others thereof employed for the preparation of such products which will be exemplified in the products and process hereinafter disclosed. The scope of the invention will be indicated in the claims.

According to the present invention, synthetic resinous condensation products may be prepared from a straight-chain aliphatic unsaturated mono-carboxylic acid of low molecular weight, a polyhydric alcohol, and an organic polycarboxylic acid; more particularly, from a straight-chain aliphatic unsaturated mono-carboxylic acid of low molecular weight and a partially esterified polyhydric alcohol, containing an unreacted alcoholic group and obtainable by the interaction of a polyhydric alcohol with an organic polycarboxylic acid.

In preparing the resinous condensation products of the present invention in accordance with a preferred method of procedure, a partially esterified polyhydric alcohol may be prepared by the incomplete esterification of a polyhydric alcohol with an organic polycarboxylic acid, more particularly a halogen-substituted organic polycarboxylic acid, in accordance with the known procedure (e. g., U. S. P. 1,098,776); and the resulting intermediate product may be heated with a straight-chain aliphatic unsaturated mono-carboxylic acid of low molecular weight, more particularly, acrylic acid.

Among the polyhydric alcohols which may be employed in accordance with the present invention, there may be mentioned by way of example, glycerol, the polyglycerols (e. g., diglycerol, triglycerol, etc., or mixtures of polyglycerols), glycols (e. g., ethylene glycol, propylene glycol, butylene glycol, etc., or mixtures of glycols), polyglycols (e. g., diethylene glycol, triethylene glycol, etc., or mixtures of polyglycols), penta-erythritol, mannitol, glucose, sugar, dextrine, starch, etc. Mixtures of two or more polyhydric alcohols, or of a polyhydric alcohol with a mono-hydric alcohol also may be used.

Among the polycarboxylic acids which may be employed in accordance with the present invention there may be mentioned, by way of example, aliphatic or aromatic polycarboxylic acids, e. g., succinic acid, malic acid, oxalic acid, ethylene-alpha-beta-dicarboxylic acids (such as, fumaric acid and maleic acid), malonic acid, sebacic acid, citric acid, tartaric acid, pyrotartaric acid, malo-malic acid, glutaric acid, phthalic acid, diphenic acid, 1.8-naphthalic acid, etc.; halogenated phthalic acids (e. g., tetrachloro-phthalic acid); halogenated succinic acids (e. g., mono-chloro-succinic acid, monobromo-succinic acid, dichloro-succinic acid, dibromo-succinic acid, trichloro-succinic acid, tribromo-succinic acid, etc.); halogenated malic acids (e. g., mono-chloro-malic acids, monobromo-malic acid, etc.); halogenated maleic acids, (e. g., mono-, or di-, chloro-, or bromo-, maleic acids, etc.); halogenated fumaric acids; halogenated sebacic acids; halogenated citric acids; halogenated pyro-tartaric acids; halogenated malo-malic acids; halogenated glutaric acids; halogenated adipic acids; and the like. Mixtures of two or more polycarboxylic acids also may be used.

The unsaturated aliphatic acids of low molecular weight which may be employed in the preparation of the products of the present invention include acids of the oleic acid series having a low molecular weight (as for example, acrylic acid, vinylacetic acid, crotonic acid, allylacetic acid, etc.), acids of the propiolic acid series having a low molecular weight (as for example, propiolic acid, tetrolic acid, ethyl propiolic acid, propyl propiolic acid, etc.), vinyl acrylic acid, sorbic acid, and the like. Mixtures of two or more straight-chain aliphatic unsaturated mono-carboxylic acids of low molecular weight also may be employed.

The extent to which the reaction mixture may be heated and the temperature employed may be varied widely, depending upon the properties of the products desired to be obtained (e. g., solubility, fusibility, hardness, etc.) as will be evident to a chemist skilled in the making of alkyd resins.

Resinous products of somewhat different constitution but of similarly improved properties also may be prepared in accordance with the present invention by mixing together the polyhydric alcohol with the polycarboxylic acid and the aliphatic unsaturated mono-carboxylic acid of low molecular weight, for example, in proportions providing a free hydroxyl group for each carboxyl group and heating the mixture.

Resinous products furthermore may be prepared from a partially esterified polyhydric alcohol and a mixture of a straight-chain aliphatic unsaturated mono-carboxylic acid of low molecular weight with another suitable acid or derivative, as for example, an aliphatic mono- or polycarboxylic acid (e. g., malic acid, succinic acid, fumaric acid, maleic acid, oxalic acid, malonic acid, sebacic acid, citric acid, tartaric acid, pyrotartaric acid, malo-malic acid, glutaric acid, adipic acid, butyric acid, propionic acid, stearic acid, palmitic acid, lactic acid, glycolic acid, chlor-acetic acid, chlor-propionic acid, a halogen-substituted aliphatic polycarboxylic acid— such as, those above mentioned—etc.), an aromatic carboxylic acid (e. g., benzoic acid, phthalic acid, cinnamic acid, salicylic acid, chlor-benzoic acid, diphenic acid, 1.8-naphthalic acid, benzoyl-benzoic acid, methyl-benzoyl-benzoic acid, etc.), a natural resin or resin acid (e. g., colophony, copal, Congo, abietic acid, etc.), or an unsaturated vegetable or animal oil, or acid thereof, (e. g., linseed oil, China-wood oil, fish oil, soya bean oil, castor oil, linoleic acid, linolenic acid, oleic acid, oleostearic acid, mixed fatty acids of the drying oils, etc.).

As illustrative embodiments of a manner in which the invention may be practiced the following examples are presented.

*Example 1.*—A mixture of 185 parts of glycerol with about 355 parts of mono-bromo-maleic anhydride

is slowly heated with stirring. As the heating progresses, the mixture at first becomes homogeneous and then gradually increases in viscosity, while gentle distillation takes place. Upon completion of this stage of heating, as indicated by a decrease in the evolution of gas, there is added to the mixture 145 parts of acrylic acid and the mixture is further heated at about 180° to 200° C. until a sample on cooling forms a solid mass soluble in acetone. Upon completion of this stage of heating, the product may be allowed to cool, whereupon there results a hard, brittle, slightly colored resinous material soluble in the cold in acetone, diethylphthalate, and the like. This material, which may be designated a stage-A resin, may be mixed with a suitable filler, as for example sand, asbestos, mica, and the like, and employed as a plastic composition or cement; or it may be used in solution in a suitable solvent as a varnish, as an impregnating solution for fabrics or electrical apparatus; or it may be incorporated into a nitro-cellulose lacquer; etc.

*Example 2.*—The stage-A resin resulting from the process of Example 1 is slowly heated until a sample is no longer soluble in cold acetone. The resulting product, which may be designated a stage-B resin, is a resinous material of greater hardness than the stage-A resin from which it is produced; it is relatively infusible, having no true melting point, and it is no longer soluble in most of the solvents for said stage-A resin. If ground and allowed to stand in contact with acetone, it will swell, taking up some of the acetone and changing from a dry powder to a sort of gel. This stage-B product may be incorporated with filling materials and employed as a molding or plastic composition.

*Example 3.*—The stage-B resin resulting from the process of Example 2 is further heated until a sample when submerged for 2 minutes in boiling distilled water does not show a "bloom" on its surface. The product, which may be designated a stage-C resin, is relatively infusible, is insoluble in the usual resin solvents, will no longer swell when left in contact with acetone, and is harder and more resistant than the stage-B resin from which it was produced. This stage-C resin, although relatively infusible, when heated will still soften to a sufficient extent to enable it to take an impression in a mold under heat and pressure. It accordingly may be employed in making molding compositions and products, especially those subject to the action of water.

*Example 4.*—A mixture of about 92 parts of glycerol and 98 parts of maleic anhydride is heated with stirring to form an intermediate resinous product, in a manner similar to that described in Example 1. There is then added about 85 parts of vinyl acetic acid, and the heating is continued further at a moderate temperature until a sample upon cooling forms a resinous product soluble in acetone. This product may be further heated to form a harder, less fusible and less soluble B-stage or C-stage resin in accordance with the above examples.

It will be realized that the process is not limited to the above specific examples but may be varied within wide limits without departing from the spirit and scope of the invention.

Thus, in carrying out the condensation the reaction may be caused to take place in a suitable solvent or diluent, such as, alcohol, diethyl phthalate, benzyl benzoate, and the like.

The temperatures at which the condensations are caused to occur may vary. Temperatures up to about 200° C. may be employed in the first stage of the reaction, and higher or lower temperatures may be employed in the final stages of heating. Lower temperatures are preferred to higher temperatures although they require a longer period of heating for the production of a product of the same stage of condensation than do the higher temperatures, in view of the greater ease of control of the reaction at the lower temperatures.

If desired, the final reaction may be accelerated by carrying out the condensation in the presence of a suitable catalyst, such as, a suitable metal oxide, e. g., zinc, magnesium, or calcium oxide; or a finely divided metal, e. g., zinc or iron; a suitable liquid catalyst, e. g., furfural or its derivatives and equivalents (methyl furfural, phenyl-methyl furfural, furfuracetone, etc.); or a small amount of a phenol-formaldehyde condensation product.

The proportions in which the reacting materials are employed may be varied within wide limits. In the preparation of the intermediate condensation product, the polyhydric alcohol preferably may be employed in an amount relative to the carboxylic acid to provide a product which contains an unreacted alcoholic group. The amount of unsaturated acid employed to complete the esterification may be varied, depending upon the properties desired of the final product.

The preparation of resinous products of the present invention is not limited to the methods of procedure hereinbefore described, but other suitable methods of preparation may be employed.

The various resins included within the scope of the invention are not limited to the uses above indicated but may be applied for various purposes, the uses of the individual resins being dependent upon the particular properties of said individual resins, as will be evident to those familiar with the subject. Thus, a resin of a suitable fusibility and solubility may be employed either as such or in solution for the preparation of varnishes; baking enamels; paints; lacquers; adhesives; cements; impregnating, indurating, and the like compositions; molding and related plastic compositions; celluloid substitutes; stencil-paper; insulating compositions; phonograph and similar records; films; threads; enamelled wire and metal plate; floor and roof coverings; abrasive manufactures; laminated fabric boards; and the like.

The resins also may be employed, where desirable, in compositions including other materials, as for example, other resinous or gummy materials (such as, artificial resins, e. g., the phenol-formaldehyde resins, other alkyd resins, phenol-furfural resins, furfural-aniline resins, aldehyde-ketone resins, aldehyde-amine resins, sulfur resins, etc.; the natural resins, e. g., colophony, shellac, copal, dammar, Kauri, Congo, etc.; resins or gums of the rubber type, e. g., rubber, gutta-percha, ballata, etc.; and the like); cellulose compounds (such as, nitrocellulose, cellulose ethers, and cellulose esters); plasticizing, flexibilizing, and similar compositions (such as, camphor, castor-oil, glycerine, naphthalene, anthracene, chlor-naphthalene, aryl-phosphates, alkyl and arylphthalates, benzyl-benzoate, acetanilide, etc.); diluting and cheapening compositions (such as, pitch, asphalt, stearine pitch, gilsonite, etc.); fillers and other inert solid materials (such as, asbestos, sand clay, talc, mica, hardened resins, wood flour, rotten stone, cotton, etc.); suitable solvents; or mixtures of the above or similar compositions.

In preparing mixed compositions of the resins of the present invention and other artificial resins (as for example, those above mentioned) the resins may be mixed in the intermediate stages of their formation and the mixture may be heated to produce a complex resinous composition; thus, a fusible and soluble resin of the present invention may be mixed with a stage-A phenol-formaldehyde resin, and the mixture may be heated to effect further condensation.

Furthermore, in preparing the resins, it is not necessary, in the production of a resin of the B-stage, to interrupt the heating at the A-stage, or, in the production of a resin of the C-stage, to interrupt the heating at the A- or the B-stage; but the reaction may be carried through to the desired final stage without interruption. And in making a composition or article having the properties of one of the later-stage resins from one of the intermediate-stage resins, the other ingredients which are to be included in the final composition may either be incorporated with the resin of the desired final stage, or they may be incorporated with an intermediate-stage resin, and the mixture may be heated until conversion to the desired stage has taken place. If desired, such heating may be carried out, either for the whole or a part of the conversion period, in a suitable mold.

Inasmuch as in the preparation of the resinous products of the invention the anhydrides of the acids above mentioned may be employed alternatively or in admixture with the organic acids, it will be understood that where above or in the claims the acid is referred to, both the acid and the anhydride are intended to be included. It is also to be understood that the expressions "aliphatic unsaturated mono-carboxylic acid of low molecular weight" and "mono-carboxylic acid of the oleic acid series having a low molecular weight" as employed in the specification and claims denote and include only those of such acids which have a molecular weight less than that of oleic acid (282).

Since, in carrying out the above process, changes may be made without departing from the scope of the invention, it is intended that all matter contained in the above description shall be interpreted as illustrative and not in a limiting sense, except as limited by the claims.

I claim:

1. A resinous condensation product derived from a polyhydric alcohol, a halogen-substituted aliphatic polycarboxylic acid, and a straight-chain unsaturated aliphatic monocarboxylic acid of the oleic acid series having a molecular weight not exceeding about 126.

2. A resinous condensation product of the interaction of glycerol, a chloro-substituted aliphatic polycarboxylic acid, and acrylic acid.

3. A resinous condensation product derived from a straight-chain monocarboxylic acid of the oleic acid series having a molecular weight not exceeding about 126, glycerol and a halogen-substituted aliphatic polycarboxylic acid.

4. A resinous condensation product derived from a straight-chain monocarboxylic acid of the oleic acid series having a molecular weight not exceeding about 126 and a glycerol ester of a halogen-substituted aliphatic polycarboxylic acid, which ester contains a free alcoholic group.

5. A resinous condensation product derived from a straight-chain unsaturated aliphatic monocarboxylic acid having a molecular weight not exceeding about 126 and a mono-chloro-maleic acid ester of glycerol, which ester contains a free alcoholic group.

6. A resinous condensation product of the interaction of acrylic acid and a mono-chloro-maleic acid ester of glycerol, which ester contains a free alcoholic group.

7. A process of producing resinous condensation products which comprises heating a polyhydric alcohol with a halogen-substituted aliphatic polycarboxylic acid and a straight-chain monocarboxylic acid of the oleic acid series having a molecular weight not exceeding about 126.

8. A process of producing resinous condensation products which comprises heating a polyhydric alcohol with a chloro-substituted aliphatic polycarboxylic acid in an amount insufficient completely to esterify all of said polyhydric alcohol, and heating the resulting partially esterified polyhydric alcohol with a straight-chain monocarboxylic acid of the oleic acid series having a molecular weight not exceeding about 126.

9. A process of producing resinous condensation products which comprises heating glycerol with a halogen-substituted aliphatic polycarboxylic acid in an amount insufficient completely to esterify all of said glycerol, and heating the resulting partially esterified glycerol with a straight-chain monocarboxylic acid having a molecular weight not exceeding about 126.

10. A process of producing resinous condensation products which comprises heating glycerol with mono-chloro-maleic acid in an amount insufficient completely to esterify all of said glycerol, and heating the resulting partially esterified glycerol with acrylic acid.

11. A resinous condensation product derived from a polyhydric alcohol, an ethylene-alpha-beta-dicarboxylic acid, and an unsaturated aliphatic monocarboxylic acid of low molecular weight.

12. A process of producing resinous condensation products which comprises heating a polyhydric alcohol with an ethylene-alpha-beta-dicarboxylic acid and acrylic acid.

FRITHJOF ZWILGMEYER.